United States Patent [19]
Brim

[11] Patent Number: 5,835,914
[45] Date of Patent: Nov. 10, 1998

[54] METHOD FOR PRESERVING AND REUSING SOFTWARE OBJECTS ASSOCIATED WITH WEB PAGES

[75] Inventor: David Neal Brim, Custer, Wash.

[73] Assignee: Wall Data Incorporated, Kirkland, Wash.

[21] Appl. No.: 800,545

[22] Filed: Feb. 18, 1997

[51] Int. Cl.[6] .................................................. G06F 17/30
[52] U.S. Cl. .................................. 707/206; 707/2; 707/3; 707/6; 707/10; 707/513; 707/104; 395/712; 395/200.33
[58] Field of Search ............................. 395/712, 200.33, 395/200.49, 200.23; 707/206, 513, 501, 1, 6, 2, 4, 10, 103, 104, 3

[56] References Cited

U.S. PATENT DOCUMENTS

| | | | |
|---|---|---|---|
| 5,706,502 | 1/1998 | Foley et al. | 707/10 |
| 5,715,453 | 2/1998 | Stewart | 707/104 |
| 5,740,440 | 4/1998 | West | 395/704 |
| 5,742,768 | 4/1998 | Gennaro et al. | 1/1 |
| 5,751,956 | 5/1998 | Kirsch | 395/200.33 |
| 5,761,499 | 6/1998 | Sonderegger | 395/712 |

FOREIGN PATENT DOCUMENTS

| | | |
|---|---|---|
| WO9102307A | 2/1991 | WIPO . |
| WO9700475 A | 1/1997 | WIPO . |

OTHER PUBLICATIONS

Shapiro, M., "*A Binding Protocol for Distributed Shared Objects*," Proceedings of the International Conference on Distributed Computing Systems, NR Conf. Jun. 21–24, 1994, pp. 134–141.

Brown, M.H. et al., "*Distributed Active Objects*," Computer Networks and ISDN Systems, 28:11, pp. 1037–1052, (May 1996).

Chappell, David, *Understanding ActiveX and OLE*, Microsoft Press, Washington, 1996, Chapter 5, "Persistence," pp. 107–128.

*Primary Examiner*—Thomas G. Black
*Assistant Examiner*—Srirama Channavajjala
*Attorney, Agent, or Firm*—Christensen, O'Connor Johnson & Kindness PLLC

[57] ABSTRACT

A method for preserving the existence of a control during the lifetime of its container application is provided. A naming control is specified in an HTML document prior to specifying the target control. The naming control receives as a parameter a control identifier, which is passed to the class factory of the target control prior to creation of the target control. The class factory maintains a control list, with an entry for each control identifier corresponding to a currently active control. When a Web page is exited, the control is not deleted. Upon returning to the Web page and prior to creating a new control, the control list is checked to determine whether a control with a desired identifier is currently active. If so, a pointer to the corresponding control is returned, rather than create a new control. In this manner, a connection between a control and a host computer over a network can be maintained, without the necessity to destroy the connection and create a new connection each time the corresponding Web page is exited and revisited.

20 Claims, 10 Drawing Sheets

```
        <HTML>

<1--Naming control-->
       <OBJECT
702          CLASSID="clsid:7EF0DC5A-C827-11CF-A07F-0020AFF17A14"
             HEIGHT=10
             WIDTH=10>
          <PARAM NAME="ControlName" VALUE=AS400">
706      </OBJECT>

<1--Target control-->
        <OBJECT ID="AS400"
704          CLASSID="clsid:7EF0DC56-C827-11CF-A07F-0020AFF17A14"
             HEIGHT=400
             WIDTH=550>
        </OBJECT>

</HTML>
```

*Fig. 7*

METHOD FOR PRESERVING AND REUSING SOFTWARE OBJECTS ASSOCIATED WITH WEB PAGES

FIELD OF THE INVENTION

The present invention relates to methods of controlling communication between a client computer and a server computer, and in particular, methods of controlling the creation and destruction of software objects on a Web page.

BACKGROUND OF THE INVENTION

In recent years, there has been a tremendous proliferation of computers connected to a global network known as the Internet. A client computer connected to the Internet can download digital information from special computers called World Wide Web servers, or simply Web servers, that are also connected to the Internet. Web browser programs running on the client computers translate the downloaded digital information into a visual form called a "Web page" that is perceptible by a user.

In the past, the content or data contained in a Web page was static and did not change after being displayed in a Web browser program. More recent technology allows the inclusion of program code with the digital information downloaded from Web servers to define software components that execute while a Web page is being viewed with the browser program. The software components provide interactive, dynamic content in Web pages. The components may establish and maintain interactive sessions between a user and remote computers, display animation, or present regularly updated information. Microsoft Corporation, of Redmond, Wash., has created a standard interface for the software components that comprise the program code. The standard is referred to as ActiveX, and software components that are compliant with ActiveX are referred to as ActiveX controls. For example, a Stock Ticker ActiveX control can display current stock prices that are continuously scrolled across a defined area within a Web page that is displayed by a Web browser.

In addition to displaying static and dynamic information in a Web page, Web browsers and Web servers provide the capability for users to navigate among numerous Web pages along with the capability of returning to a previously viewed Web page. Currently, when a user exits a Web page, the Web browser destroys the ActiveX controls contained therein. If the user later returns to a previously viewed Web page, the Web browser must create a new set of ActiveX controls. For controls like the Stock Ticker described above, this is acceptable because a Stock Ticker control needs only to continually retrieve the latest stock prices and display them.

In some instances, it is desirable that an ActiveX control preserves a specific state between invocations by the Web browser. For example, an ActiveX control that accesses a host computer preserves a connection with the host and the current host application screen to which the user has navigated. In addition, the ActiveX control preserves any data the user has entered within the host application screen. In the past, ActiveX controls are destroyed when a Web browser exits a Web page by navigating to a different Web page. When a control is destroyed and recreated upon leaving and returning to a Web page, the host connection must be reestablished. The user must then connect to the host, navigate to the appropriate application screen, and reenter any data that was lost.

To eliminate the need to recreate a control each time a Web page is accessed, it is desirable to provide the ability for a software component, such as an ActiveX control, to remain in existence and retain state information when a user leaves a Web page and returns to it. In addition, it is desirable that an ActiveX control retain its link, or correspondence to a particular Web page, and that any reference to the control remain valid when a Web browser returns to the page containing the control. It is also desirable to allow the ActiveX control to execute after a user exits from the corresponding Web page.

SUMMARY OF THE INVENTION

The present invention is a method of controlling the existence of a software component that is associated with a Web page in order to reuse the software component when the corresponding Web page is revisited. The invention provides a naming control and a class factory object, in addition to modifications to the normal processing within a control. A Web browser receives one or more instructions that define a Web page. The browser translates the instructions to create a Web page, and invokes a command to create a control. The class factory object receives the command and determines whether the desired control has been previously created and remains in existence. If the desired control exists, the class factory returns a reference to the control without creating a new control. If the desired control does not exist, the class factory creates the desired control, returning a reference to the newly created control.

The naming control passes a predetermined identifier of the desired control to the class factory. The class factory uses the identifier in its determination of whether the desired control already exists. The class factory maintains a list of control identifiers and determines whether the desired session control already exists by determining whether the identifier corresponding to a desired session control exists in the list.

The present invention also provides a method of preventing a control from being destroyed when the Web browser exits from a Web page. When the control is created, the class factory increments a reference count corresponding to the control. Incrementing the reference count prevents the reference count from being decremented to zero, thereby preventing the destruction of the control when the Web browser exits from a Web page.

As will be readily appreciated from the foregoing description, the present invention provides the ability to maintain the existence of a control associated with a Web page beyond the period of the visit to the Web page. When the Web browser exits the Web page and revisits the page, the control has not been destroyed. The control identifier provides a mechanism to link the control with the specific instruction to create it, so that when the instruction is executed upon revisiting the Web page, a reference to the existing control can be used. The invention allows a dynamic control to continue executing after exiting from the Web page, and upon a revisit to the Web page. In situations where the control maintains a communications session with a host computer, the invention allows the control to continue the communications session, without having to reestablish it. The invention also has the advantage that the program code to implement it can accept instructions to either have the control continue beyond exiting from its Web page, or to destroy itself when the Web browser exits the Web page. The instructions can be supplied in the form of HTML instructions in the HTML document.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1A:
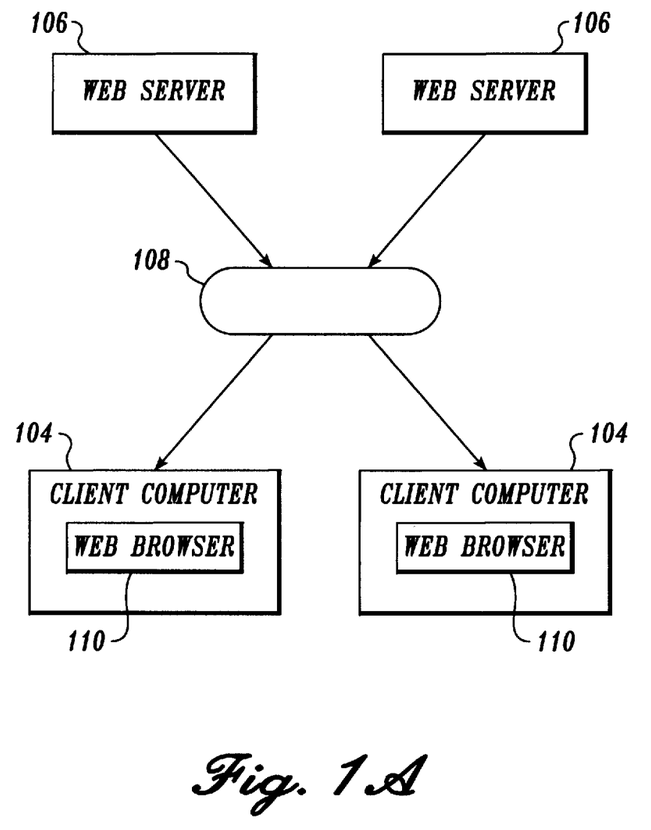
FIGS. 1A and 1B are block diagrams illustrating an exemplary network architecture in which the invention is used.

As indicated above, the present invention is a method of creating ActiveX controls that are not destroyed when a Web browser exits from a Web page. The controls are reused when the Web browser revisits the Web page. FIG. 1A illustrates an exemplary architecture 102 in which one or more client computers 104 communicate with one or more server computers 106 via a network 108, or other communication medium. Each client computer 104 is preferably a personal computer of the type that includes an amount of volatile memory, and non-volatile memory such as a hard disk or other data storage device. In addition, each client computer 104 includes a processor, a keyboard, a directional input device such as a mouse, and a monitor, such as a cathode ray tube (CRT) or a liquid crystal display (LCD). Programs executed by the computer preferably use a graphical user interface that is displayed on the monitor. An example of a graphical user interface is the Windows® 3.1 operating system produced by the Microsoft Corporation.

The server computer 106 is preferably a personal computer having the elements of a client computer 104 as described above. The client computer 104 and the server computer 106 communicate with each other via the network 108, which could be a wide area network, a local area network, or a TCP/IP connection. In the presently preferred embodiment of the invention, the network 108 is the Internet. The Internet is a commonly used wide area network that comprises many networks linked together to form a global network. The Internet, wide and local area networks, and TCP/IP communication mediums are well understood by those of ordinary skill in the art and need not be discussed in further detail here, except as they relate to the present invention.

Connection of the client and server computers to the Internet is provided in a conventional manner by an Internet service provider. Using the Internet, the server computers 106 are able to communicate with the client computers 104 utilizing a protocol known as Hypertext Transfer Protocol (HT.). When operated in this manner, the server computers are commonly referred to as World Wide Web servers, or simply Web servers. When the network 108 is a local area network, it is referred to as an "intranet."

The Web server computers 106 transmit documents over the network 108 to one or more of the client computers 104. Each server executes a Web server program (not shown) that receives requests for documents from the client computer 104, and, in response, transmits documents to the client computer 104 over the network 108. In the presently preferred embodiment of the invention, the document is comprised of HyperText Markup Language (HTML) statements and embedded scripts that together are referred to as an HTML document.

HTML is a markup language, and provides document formatting information along with text. A script is a series of one or more instructions from a programming language that is designed to be embedded within an HTML document. Visual Basic Script, created by the Microsoft Corporation, of Redmond, Wash., and JavaScript, created by Sun Microsystems, of Mountain View, Calif., are two commonly used scripting languages. A number of Web server programs are commercially available, such as Microsoft's Internet Information Server and the Netscape Communications Server by the Netscape Corporation.

Figure 1B:
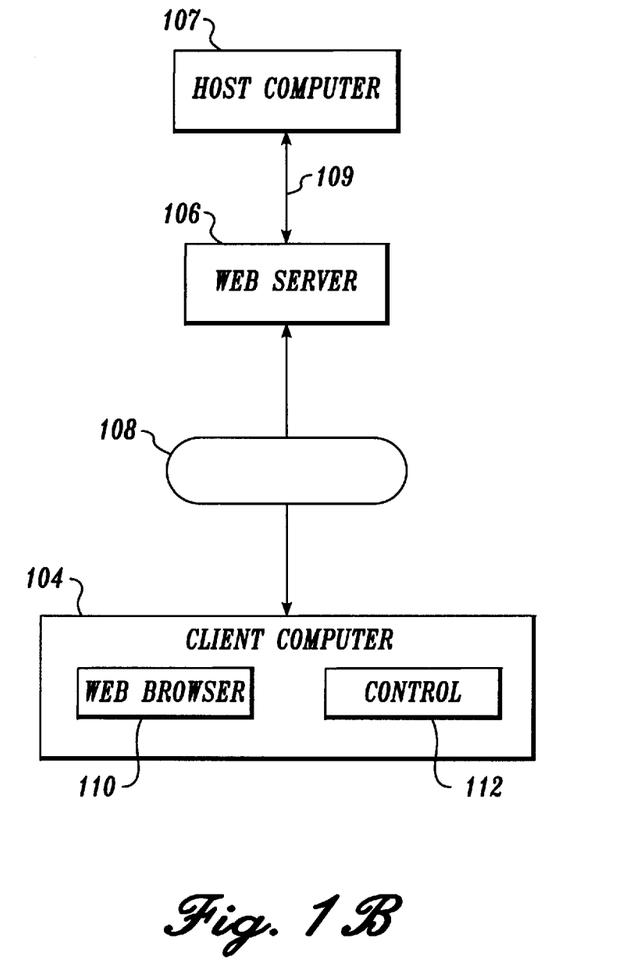

FIG. 1B illustrates, in further detail, the network architecture of FIG. 1A. The client computer 104 executes a browser application 110 that communicates with the Web server programs running on the server computers 106 and displays HTML documents received from the server computer 106. Browser applications that communicate over the Internet and use HTTP are commonly referred to as Web browsers. The Web browser application 110 may comprise a single application program, multiple application programs, or a number of software components that work together to implement the functionality of the browser application. For example, a Web browser may comprise a document retrieval component and a separate HTML viewing component, each performing separate tasks of a Web browser. As used in this application, the term "Web browser" refers to a collection of one or more software applications or components that operate to implement all or part of the functionality of a Web browser. Internet Explorer™ 2.0 by Microsoft Corporation and Netscape Navigator™ 3.0, by Netscape Communications Corporation, of Mountain View, California, are two examples of Web browser applications that can be used with the present invention when running on the Windows® 3.1, Windows 95®, or Windows NT® operating systems.

FIG. 1B illustrates how a host computer 107 may be connected to the Internet so that users of a client computer can connect to the host and download Internet Web pages. The host computer 107 is connected to the server computer 106 by a communications medium 109 that may be a direct link or a network, such as an SNA network. The communications medium 109 enables the server computer 106 and the host computer 107 to communicate by exchanging commands and data. In such an embodiment, a user operating the Web browser 110 on the client computer 104 communicates with the host computer 107, utilizing the server computer 106 as an intermediary. The client computer 104 sends commands, or queries, over the network 108 to the server computer 106. The server computer 106 sends commands over the communications medium 109 to the host computer 107, and receives data transmitted from the host computer. The server computer 106 sends data from the host computer 107 over the network 108 to the client computer 104 in the form of one or more HTML documents and other data referenced by the HTML documents.

Some session controls may initialize a communications link with the host computer 107. The initialization of a communications link is sometimes referred to as "connecting" to the host computer. Destroying the communications link is referred to as "disconnecting" the host computer. In a system where the control 112 is repeatedly created and destroyed, the control must repeatedly connect to the host computer each time the control is created. By maintaining the existence of the control 112, repeated connecting to the host computer is not necessary.

The Web browser 110, upon receiving a new HTML document over the network 108, interprets the HTML statements and any embedded scripts, and displays a "Web page." The steps of receiving an HTML document, interpreting the HTML statements, and displaying a Web page are referred to as "visiting" the Web page. A browser "exits" a Web page when it no longer displays the Web page. Some browsers save HTML documents in a portion of memory known as a "cache." When the browser visits a Web page that has previously been visited, the corresponding HTML document may be obtained from the cache instead of from the Web server. The Web page preferably contains information that was transmitted by the host computer 107 over the communications medium 109.

Figure 1C:
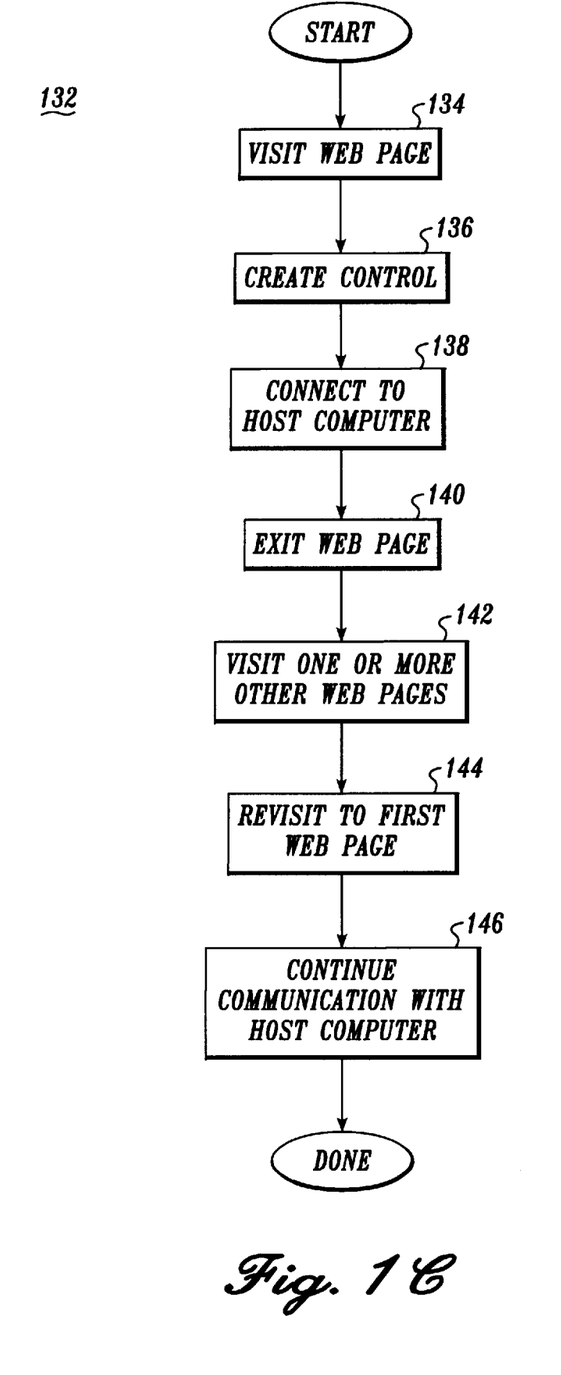
FIG. 1C is a flow diagram illustrating the process of creating and maintaining a connection with a host computer in accordance with the present invention.

As indicated above, the present invention eliminates the need for a Web browser program to recreate the session controls that have been previously created in a Web page. The basic operation of the invention is shown in the flow chart in FIG. 1C. FIG. 1C illustrates a series of steps 132 wherein the present invention is employed. At a step 134, the Web browser visits a Web page. At a step 136, one or more controls 112 (FIG. 1B) are created on the Web page. At a step 138, the control that operates to establish a connection with the host computer connects to the host computer. At a step 140, the browser exits the first Web page. At a step 142, the browser "visits" a second Web page, performing the necessary actions according to the instructions received in a second HTML document.

The step 142 may comprise visits to a plurality of Web pages. At a step 144, the browser revisits the first Web page, which has the associated instructions for creation of the control 112. At a step 146, the control continues communication with the host computer.

An important feature in this series of steps 132 lies in the absence of certain steps. Specifically, the control 112 created on the first Web page and employing the invention is not destroyed between the creation of the control at step 136 and the continued communication with the host computer at the step 146, even though the Web browser exits the first Web page (step 140) and visits other Web pages (step 142) during this interval. There is no disconnecting from the host computer, and there is not a second connecting to the host computer between the step of connecting to the host computer, at the step 138, and the continued communication with the host computer, at the step 146. The host computer proceeds with the communication in the same manner as if the step 140 of exiting the Web page, the step 142 of visiting new Web pages and the step 144 of revisiting the first Web page, never occurred.

In addition, the control 112 may continue to execute subsequent to the step 140 of exiting the first Web page, and during the time period of the step 142 of visiting new Web pages and the step 144 of revisiting the first Web page. During this period of execution, the control may, for example, continue to receive data from the server computer, or from the host computer via the server computer, and send commands over the network. The control may process the data or store it at the client computer. Other types of processing during this time interval are also possible. For example, a control 112 that receives audio data from the server computer and plays the audio through a speaker connected to the client computer may continue to receive data and play the audio during the time that a user directs the Web browser to visit other Web pages. A control may also be programmed to receive and process data during this time interval and to notify the user when a certain predetermined condition is satisfied.

Figure 1D:
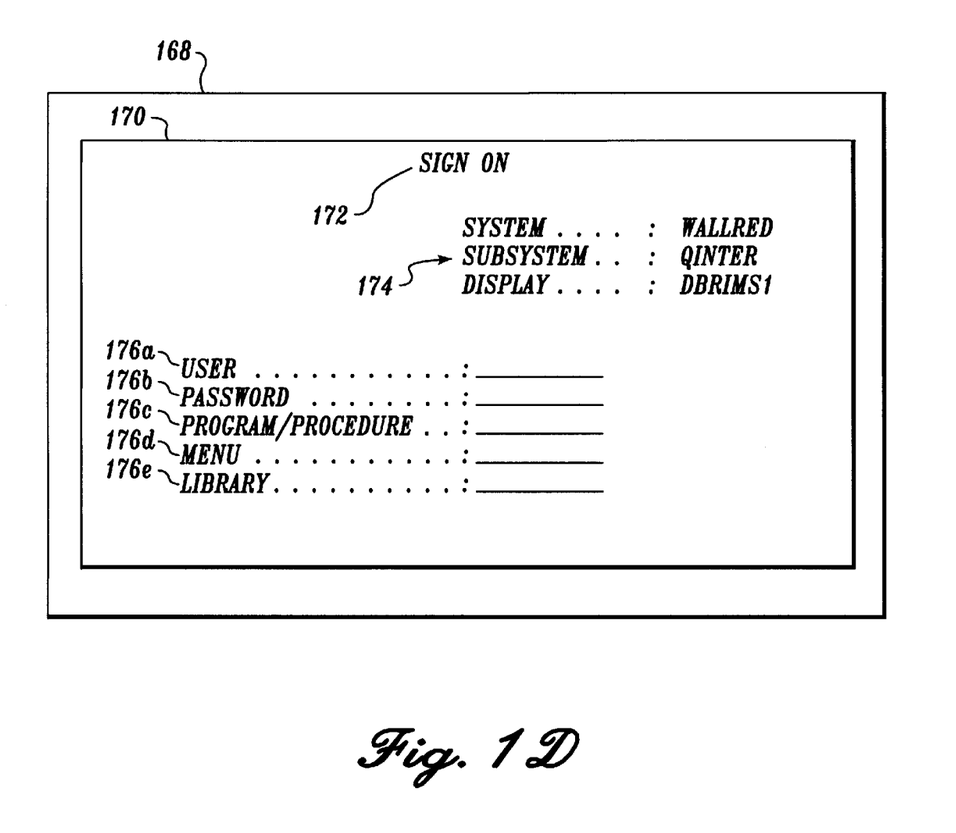
FIG. 1D illustrates an exemplary Web page that contains a control in accordance with the present invention.

FIG. 1D illustrates an exemplary Web page 168 containing a control 170 employing the invention. The depicted control contains text and input fields, the input fields providing a mechanism for a user to enter information. As depicted, the control 170 displays a title 172, and informational text 174. Five labeled input fields 176a–e prompt the user to enter the user's name, password, program name, desired menu, and library name respectively. Upon receiving the information in the input fields, the control 170 communicates the entered information to a host computer (107 in FIG. 1B). The host computer sends new information to the control 170. The control then updates the text contained within it. During a communications session between the control and the host computer, the control 170 may update its display many times while the Web browser continues to display the Web page 168.

As discussed above, while the communications link between the control 170 and the host computer is active, a user may command the Web browser to exit the depicted Web page 168 and visit one or more different Web pages (step 142 of FIG. 1C). The user may then revisit the depicted Web page 168. By employing the present invention, when the Web browser revisits the depicted Web page, the control 170 does not need to be recreated. Instead, the previously created control is redisplayed, along with the text contained therein when the Web browser exited the Web page 168.

Prior to discussing the components that comprise the invention, a brief summary of the technology used in the preferred equipment is provided. Commercial Web browsers include an interface that provides the ability to communicate with software components. The Component Object Model (COM) is a standard, developed by Microsoft Corporation, that specifies a set of interfaces for a component object. A component object that satisfies the COM interfaces is referred to as a COM object. COM objects can easily communicate with other COM objects or with "client" applications that utilize the COM interface. The COM technology includes mechanisms and interfaces for creating and destroying COM objects.

ActiveX is a technology that is based upon COM technology, and allows ActiveX controls to be created for use with Internet applications, such as Web browsers. An ActiveX control is a COM object that adheres to certain specified standards. Instructions to create ActiveX controls can be embedded in HTML documents, and cause the specified controls to be created when the corresponding Web page is displayed in the Web browser. COM objects and ActiveX controls are explained in further detail in Weiying Chen et al., *ActiveX Programming Unleashed*, (Indianapolis, SamsNet Publishing, 1997).

When a Web browser that does not employ the present invention translates an HTML document, the browser invokes commands that create the ActiveX controls specified in the HTML document. When the browser exits the Web page, the browser invokes commands that cause the ActiveX controls associated with the Web page to be deleted. When the browser returns to a previously "visited" Web page, the ActiveX controls associated with the revisited Web page are recreated. As will become apparent in the discussion that follows, the present invention provides a mechanism by which controls employing the invention remain in existence even after a browser exits a Web page and do not need to be recreated upon returning to the previously visited Web page.

Figure 2:
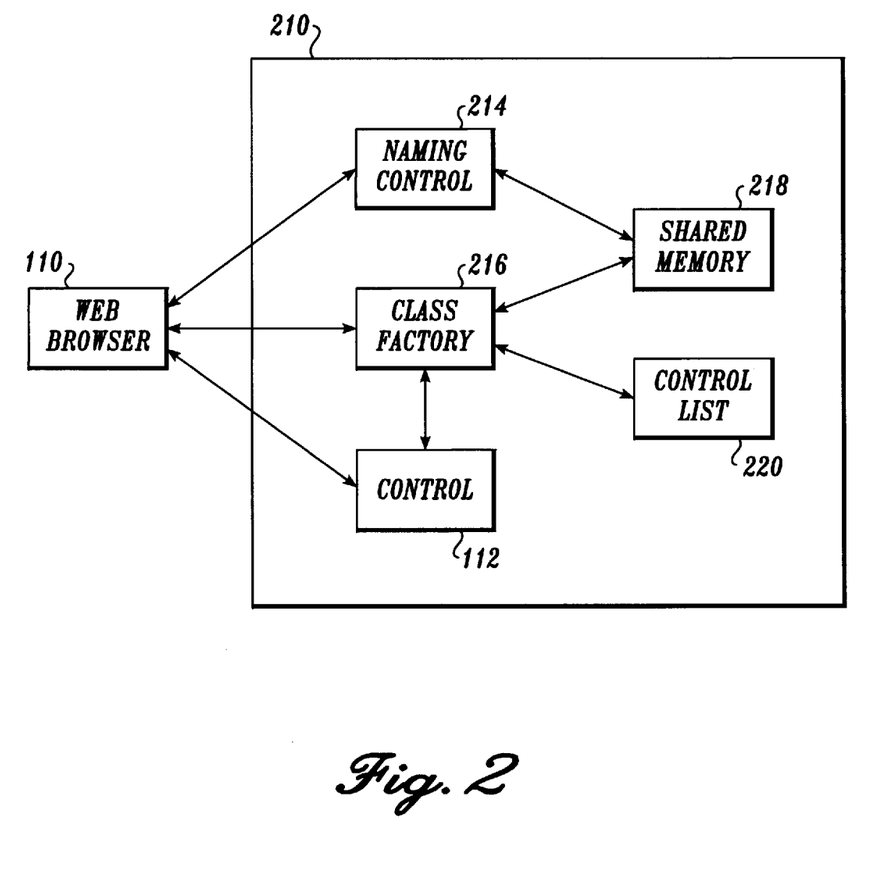
FIG. 2 is a block diagram illustrating an architecture in which the invention is used.

FIG. 2 illustrates the components that comprise the present invention. The Web browser 110 is linked to, and communicates with, three software objects that are contained within an OCX server 210: a control 112, a naming control 214, and a class factory 216. OCX servers are explained in further detail below. For purposes of this application, the control 112 is sometimes referred to as the "target" control. In the preferred embodiment, the target control can be any ActiveX control. The invention may be practiced with software objects using other technologies. The Web browser 110 is referred to as the "container" of these software objects. As discussed in further detail below, the target control is maintained, in accordance with the methods of the present invention, so that after its creation it remains in existence until the Web browser 110 terminates. The naming control 214 is a transitory control that provides the target control with a unique name that allows the class factory to locate a previously created target control. In accordance with the present invention, the class factory 216 creates the target control 112. Class factories are COM objects that operate in accordance with the ActiveX interface. To provide a standard interface for creating ActiveX controls. As discussed in further detail below, the class factory 216 handles the creation and destruction of the target control 112. Each control class has a corresponding class factory, which creates only controls of the corresponding class. The invention may be employed with any class of control. In order to better understand the invention described below, certain aspects of class factories that are relevant to the following discussion are first described.

ActiveX controls represent computer system elements, and contain program code, in the form of "methods," and data. As will be recognized by those skilled in the art of object-oriented programming, classes are abstract generic descriptions of controls and their behaviors. A class defines a certain category or grouping of methods and data within a control. The methods of a control define the control's behavior. A class serves as a template to define the behavior of a control that is created or "instantiated" from the class. A control, or instance of a class, is a specific individual entity, with its behaviors defined by its class, Many controls can be instantiated from a single control class.

The preferred embodiment of the invention includes a modification to the standard COM library. The standard COM library includes functions that supply basic services to COM objects and their containers. One of these library functions, having the name "CoCreateInstance" is called by a container to create a COM object. CoCreateInstance is called with a parameter that identifies the object's class, and uses this parameter to locate the correct class factory object. The class factory object is then invoked with a command to create, or instantiate, a new object. In particular, the command is an invocation of the method "CreateInstance." In accordance with COM technology, a class factory's CreateInstance method creates an instance of the corresponding COM object.

The present invention utilizes a section of shared memory 218 that is accessible by the naming control 214 and the class factory 216. The shared memory 218 is used to communicate a target control name from the naming control 214 to the class factory 216.

The class factory 216 has an associated control list 220, which is preferably a COM object. One control list exists for each class factory 216. The control list 220 contains a list of all controls 112 employing the invention that have been created by the corresponding class factory, and that currently exist, along with a corresponding reference pointer to each control. Preferably, each control in the control list is identified by a unique identifier. In the presently preferred embodiment of the invention, the identifier comprises a name specified in the corresponding HTML document and passed by the naming control 214. The class factory updates and reads information from the control list.

Figure 3:
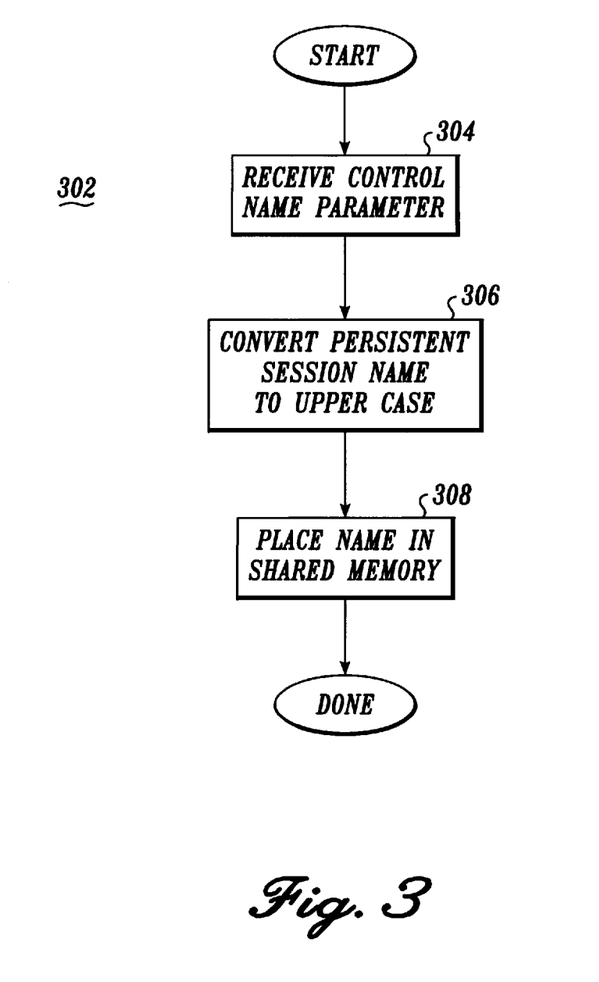
FIG. 3 is a flow diagram illustrating the process of creating a new control name in accordance with the present invention.

FIG. 3 illustrates a series of steps 302 that are performed by the naming control 214 during its initialization to pass a control name to the class factory 216 in accordance with the present invention. At a step 304, the naming control 214 receives the target control name as a parameter during invocation of the naming control. At a step 306, the control name is converted to all upper case characters. At a step 308, the modified control name is stored in the shared memory 218.

Figure 4:
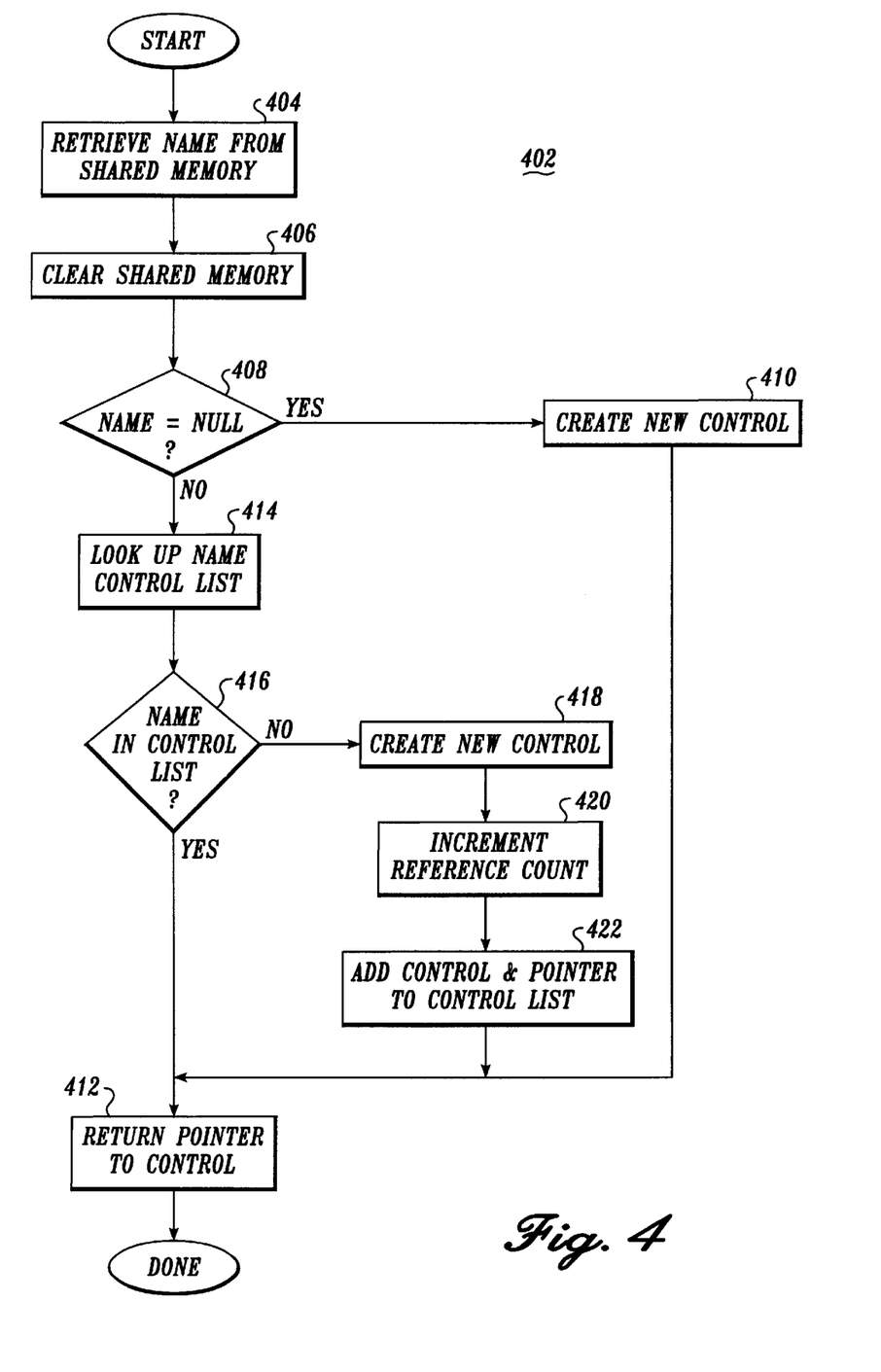
FIG. 4 is a flow diagram illustrating the process of handling a command to create an object in accordance with the present invention.

After the creation and initialization of the naming control, the Web browser invokes the class factory 216 by sending the class factory a command instructing the class factory to create a new control. One means of invoking the class factory is to call the function CoCreateInstance, as described above. FIG. 4 illustrates a series of steps 402 that are performed by the class factory 216, in accordance with the present invention, upon receipt of a command to create a new control 112. Prior to discussing FIG. 4, a brief explanation of reference counts is provided.

Every ActiveX control has a corresponding reference count that indicates the number of reference pointers to the control that are in use by a client application. When a control passes a pointer to itself, it increments its corresponding reference count. When a client application is finished using a reference pointer to a control, the client must invoke the "Release" method on the control. The Release method causes the control to decrement its corresponding reference count. A control destroys itself when its reference count drops to zero.

At a step 404, the class factory retrieves the control name that was stored by the naming control 214 in the shared memory 218. At a step 406, the class factory clears the control name from the shared memory.

At a step 408, the class factory determines whether the retrieved name is NULL, which indicates that a control name has not been retrieved. If the retrieved name is NULL, the class factory creates a new control at a step 410. After creating a new control, the class factory returns a reference pointer to the control to the browser at a step 412.

If it is determined at step 408, that the retrieved control name is not NULL, the class factory looks for the retrieved control name in the control list 220 at a step 414. As discussed above, the control list contains a list of all controls of the same class that currently exist, along with a corresponding reference pointer to each control.

At a step 416, the class factory determines whether the retrieved control name and the corresponding reference pointer exist in the control list. If the name exists, a new control does not need to be created. Instead, at the step 412, the class factory returns the pointer to the existing control. The existing control is thereafter used, instead of creating a new control.

If, at the step 416, it is determined that the retrieved control name does not exist in the control list, at a step 418, the class factory creates a new control. At a step 420, the reference count corresponding to the newly created control is incremented by one. Incrementing the reference count by one prevents the reference count from ever being decrement to zero. Therefore, the control 112 will not be deleted by the normal mechanisms that utilize reference counts to determine whether to delete a control. At a step 422, the control name and the corresponding pointer to the newly created control are added to the control list. At the step 412, the pointer to the newly created control is returned.

As illustrated in FIG. 4, and discussed above, the series of steps 402 performed by the class factory results in returning, to the browser or other client that invoked the class factory, a pointer to a control. It is transparent to the browser whether a new control is created at the step 410 or the step 418, or whether a pointer to an existing control is returned. In either case, the browser uses the pointer to the control in the same manner. The invention therefore does not require any modification of the browser.

FIG. 4 also illustrates a portion of the mechanism that allows the creator of a Web page to determine whether a control should persist after the Web browser exits from the associated Web page. As discussed above, at a step 404, the class factory retrieves the control name that was stored by the naming control in the shared memory. At a step 408, the class factory determines whether the retrieved name is NULL and, if it is NULL, creates a new control at the step 410. Therefore, if a naming control has not stored a control name in the shared memory prior to the step 404, the class factory will create a new control and bypass the steps of incrementing the reference count (step 420) and adding the control to the control list (step 422). This will cause the newly created control to be destroyed when the Web browser exits the Web page. By avoiding the creation of a naming control corresponding to a target control, the target control will not receive a control name, and therefore will be destroyed when the Web browser exits the Web page.

Figure 5:
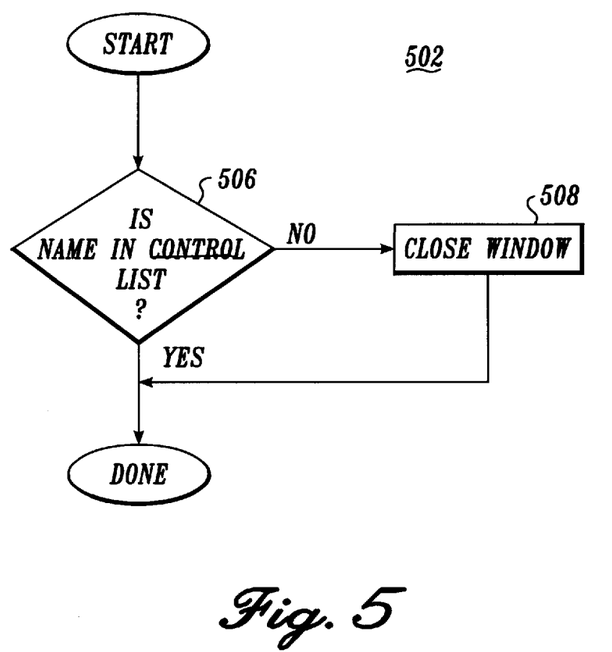
FIG. 5 is a flow diagram illustrating the process that occurs when exiting from a Web page in accordance with the present invention.

Some controls have a window that appears on the Web page. When a Web browser exits from a Web page, the operating system sends a command to all controls that have a corresponding window on the Web page. The command initiates the closing of the window corresponding to the control. In one implementation, the command results in a "OnClose" event being triggered in each control. The default handler for the OnClose event closes the window by calling the system function "DestroyWindow." FIG. 5 illustrates a series of steps 502 that are performed by a control employing the invention and having a corresponding control window, upon receiving an OnClose event, in accordance with the present invention.

At a step 506, the control 112 determines whether the control has a control name in the corresponding control list. In one implementation, the control maintains a flag with a value indicative of whether the control has a control name in the control list. At the time when the control is created and the name is added to the control list (steps 418, 420, and 422 of FIG. 4), this flag is set to a value indicating that the name is in the list. At the step 506, the control checks the value of this flag to determine whether its name is in the control list. If it is determined, at the step 506, that the control 112 does not have a name in the control list, the control closes the window at a step 508.

If, at the step 506, it is determined that the control has a control name in the control list, the processing 502 terminates, without closing its window. In this manner, the control window continues in existence. Controls that do not have corresponding windows do not receive an OnClose event, and therefore do not execute the series of steps 502 to handle the event.

As can be understood by the above discussion, the control identifier and the control list provide a mechanism by which a control is linked to a specific Web page, and specifically to one or more HTML instructions to create the control. By providing an association between a control and its corresponding creation instructions, this linking mechanism allows the methods of the invention to determine whether the specific control corresponding to the instruction exists. It also allows the methods of the invention to locate the specific existing control.

Figure 6:
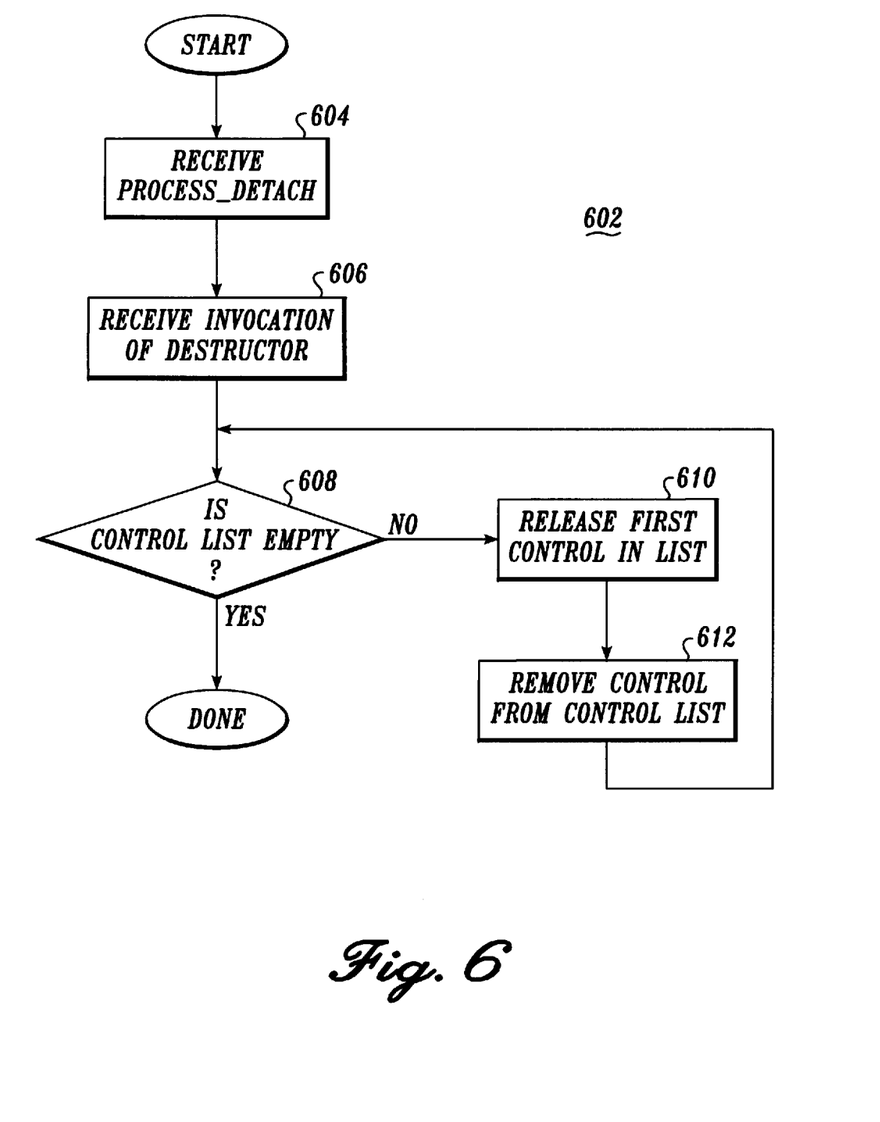
FIG. 6 is a flow diagram illustrating the termination of a Web browser in accordance with the present invention.

FIG. 6 illustrates a series of steps 602 that are performed in accordance with the present invention when the Web browser terminates. Prior to discussing FIG. 6, a brief explanation of the functioning of OCX servers is provided. An OCX server functions similarly to a dynamic link library (DLL). The protocols that must be supported by an OCX server are dependent on the particular operating system on which it runs. These protocols are documented in various publications, some of which are specific to a specific operating system. The following discussion pertains to an OCX server running on a Win32 operating system with the Microsoft Foundation Class Library. For detailed information regarding use of the Microsoft Foundation Class Library, the reader is directed to *Microsoft Visual C++Programming With MFC* (Microsoft Press, 1995).

An OCX server provides a function called "DllMain," which is called by the operating system. The DllMain function receives, as one of its parameters, a value that indicates a specific state of the operating system, or a command to perform a particular action. One of these states is defined by the predefined value "DLL_PROCESS_ DETACH." Immediately before the OCX server is unloaded, the operating system calls the DllMain function with the DLL_PROCESS_DETACH parameter providing the OCX server the opportunity to perform any termination tasks.

At a step 604, the OCX server receives a DLL_ PROCESS_DETACH command from the operating system. At the time of receiving a DLL_PROCESS_DETACH command, the Web browser has no indication that any controls continue to exist. At this time, the OCX server must delete the remaining controls. At a step 606, the "destructor" method for the control list object is invoked. Every object has a destructor method that is invoked by a run-time library linked to the OCX server. The destructor method in the control list object executes the following loop to delete all active controls employing the invention.

At a step 608, the control list object determines whether the control list is empty. If it is determined that the control list is empty, processing terminates. If it is determined that the session control list is not empty, the control list object releases the first control in the list at a step 610. At a step 612, the entry corresponding to the control deleted at the step 610 is removed from the control list. The processing then loops back to the step 608 to determine whether any more controls exist. In this manner the loop containing the steps 608, 610, and 612 continues until all controls employing the invention have been deleted.

Figure 7:
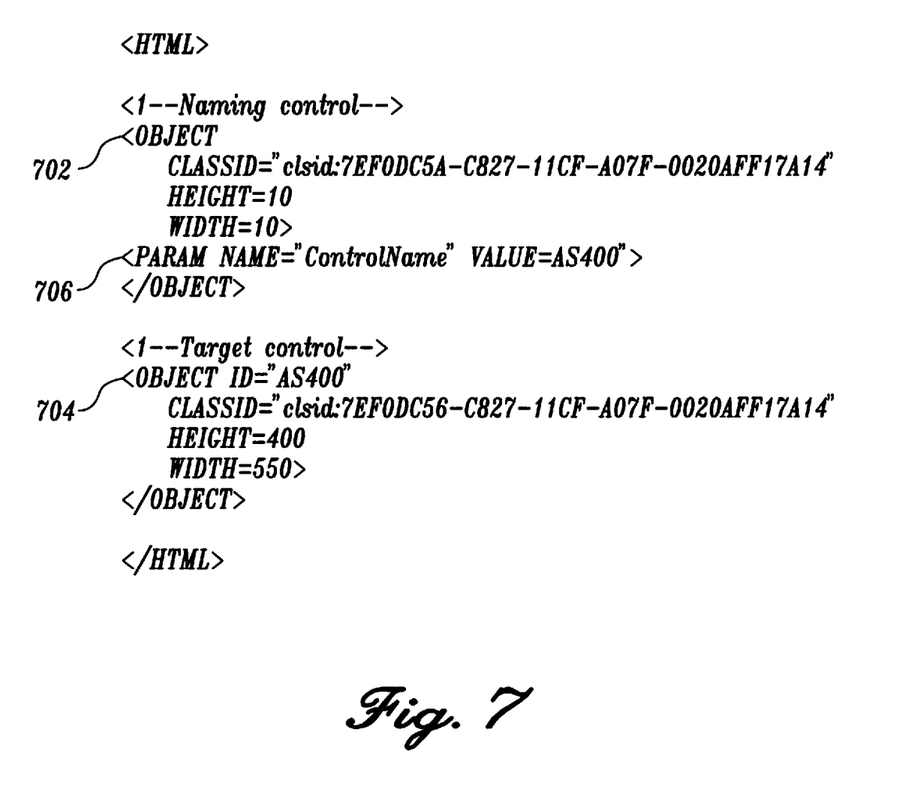
FIG. 7 is a listing of exemplary HTML instructions used to create the controls of the present invention.

FIG. 7 illustrates an exemplary listing of Hypertext Markup Language (HTML) instructions that are inserted in an HTML document to create a naming control and a target control. HTML instructions are indicated by the placement of "tags." Tags are denoted by the '<' and '>' symbols bracketing the actual tag. Most HTML instructions have a beginning tag and an ending tag, with the ending tag indicated by the slash symbol ('/'). For example, FIG. 7 includes the "<OBJECT>" and "</OBJECT>" tags delimiting an instruction to create an OBJECT. The OBJECT tag 702 specifies the creation of the naming control. The next OBJECT tag 704 specifies the creation of a corresponding target control. The PARAM NAME tag 706 passes a parameter to the naming control. The parameter name immediately follows the PARAM NAME tag. As illustrated, the parameter name is "ControlName" The designated identifier follows the key word VALUE. As illustrated in FIG. 7, the identifier "AS400" is specified as the target control name.

If the instruction to create the naming control, designated by the OBJECT tag 702, is not included in the HTML document, the naming control corresponding to the target control is not created. There will therefore be no control name passed to the target control's class factory. As discussed above, this results in the creation of a new control that does not have the property of remaining in existence after the Web browser exits the corresponding Web page.

While the preferred embodiment of the invention has been illustrated and described, it will be appreciated that various changes can be made therein without departing from the spirit and scope of the invention Reference to specific technologies, such as the ComponentObject model, ActiveX controls, and OCX servers or particular operating systems and commercially available libraries should be considered exemplary technologies, and not an indication that the invention is limited to these technologies. One skilled in this art should have the ability to implement the disclosed invention utilizing different operating systems, programming tools, and other technologies.

The embodiments of the invention in which an exclusive property or privilege is claimed are defined as follows:

1. A method of controlling the creation of a software object associated with a markup language document that at least partially defines a Web page displayed by a browser when the browser visits the Web page, the browser executing on a client computer connectable to a server computer, the method comprising:

receiving the markup language document that at least partially defines a Web page;

analyzing the markup language document to determine if an instruction to create the software object is contained therein;

determining whether the software object already exists due to having been created in response to previously receiving the markup language document associated with the software object; and if the software object does not already exist, creating the software object.

2. The method of claim 1, further comprising:

providing an indication that the software object is not to be deleted when the browser exits the Web page.

3. The method of claim 2, wherein the step of providing an indication that the software object is not to be deleted when the browser exits the Web page comprises:

modifying a count value indicative of the number of references to the software object that exist, the modification preventing the count value from becoming a predetermined value that indicates there are zero references to the software object.

4. The method of claim 1, further comprising:

if the software object already exists, providing a reference to the software object.

5. The method of claim 4, further comprising providing an identifier uniquely associated with the software object, and wherein the step of providing a reference to the software object comprises using the identifier to locate the software object.

6. The method of claim 5, wherein a class factory object performs the step of creating the software object, the method further comprising:

creating a naming object, the naming object communicating the object identifier to the class factory object.

7. The method of claim 6, wherein the naming object stores the object identifier associated with the software object in a shared memory location accessible by the class factory object.

8. The method of claim 1, further comprising:

providing an identifier uniquely associated with the software object; and wherein the step of determining whether the software object already exists uses the identifier to determine whether a reference to the software object exists.

9. The method of claim 1, further comprising:

receiving a notification that the browser is exiting from the document;

determining whether to delete the software object; and in response to the determining whether to delete the software object, selectively deleting the software object.

10. The method of claim 9, further comprising:

if the software object is not deleted in response to the determining whether to delete the software object communicating data between the software object and the server computer subsequent to said step of determining whether to delete the software object.

11. The method of claim 1, further comprising providing a link between the software object and its associated markup language document, and wherein the step of determining whether the software object exists uses the link to locate a reference to the software object.

12. The method of claim 1, further comprising providing a link between the software object and the instruction to create the software object, and wherein the step of determining whether the software object exists uses the link to locate a reference to the software object.

13. The method of claim 1, wherein the server computer communicates with a host computer, the method further comprising:

sending a command from the software object to initiate communications between the software object and the host computer;

in response to determining whether the software object already exists, if the software object already exists, providing a reference to the software object, communicating a command from the software object to the host computer, the communicating occurring subsequent to the step of returning a reference to the software object; and wherein the method does not include a second step of sending a command from the software object to initiate communications between the software object and the host computer.

14. A method of maintaining the existence of a target control executing on a client computer connected to a server computer by a network, wherein the target control is associated with a document and created when the document is displayed by a browser application, the method comprising:

creating the target control;

storing a reference to the target control;

receiving a notification resulting from the browser application exiting the document associated with the session control;

not deleting the target control upon receiving the notification;

subsequent to the notification, receiving a command to create the target control;

in response to receiving the command to create the target control, determining whether the target control exists; and in response to receiving the command to create the target control, if the target control exists, returning the reference to the target control.

15. The method of claim 14, further comprising communicating data between the target control and the server computer subsequent to the step of not deleting the target control.

16. The method of claim 15, wherein the step of communicating data between the target control and the server computer occurs prior to the step of receiving a command to create the target control.

17. A method of communicating between a client computer and a server computer connected to the client computer, wherein the client computer executes a browser program that receives at least one markup language document that at least partially defines a Web page from the server computer, the method comprising:

receiving, from the server computer, the markup language document that at least partially defines a Web page and includes an instruction to create a software object;

in response to receiving the markup language document, creating the software object;

communicating data between the software object and the server computer;

exiting the Web page subsequent to the step of communicating data between the software object and the server computer; and communicating additional data between the software object and the server computer subsequent to the step of exiting the Web page.

18. The method of claim 17, wherein the software object has an associated object window, further comprising:

displaying the object window within the Web page during the step of communicating the first data between the software object and the server computer; and not displaying the object window during the step of communicating the additional data between the software object and the server computer.

19. The method of claim 18, further comprising:

revisiting the Web page subsequent to the step of communicating the additional data between the software object and the server computer; and redisplaying the object window within the Web page subsequent to the step of communicating the additional data between the software object and the server computer.

20. The method of claim 19, further comprising:

displaying the additional data communicated between the software object and the server computer within the object window subsequent to the step of redisplaying the object window.

\* \* \* \* \*